US011670133B2

(12) United States Patent
Cardno et al.

(10) Patent No.: US 11,670,133 B2
(45) **Date of Patent: *Jun. 6, 2023**

(54) ENTERTAINMENT GAMING MACHINE BASED ON NON-RANDOM OUTCOMES

(71) Applicant: Quick Custom Intelligence, LLC, Las Vegas, NV (US)

(72) Inventors: Andrew Cardno, San Diego, CA (US); Daniel Cardno, San Diego, CA (US); Ralph W Thomas, Las Vegas, NV (US); Ralph J Thomas, Las Vegas, NV (US)

(73) Assignee: Quick Custom Intelligence, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,978

(22) Filed: Aug. 17, 2021

(65) Prior Publication Data

US 2021/0375091 A1 Dec. 2, 2021

Related U.S. Application Data

(63) Continuation of application No. 16/141,959, filed on Sep. 25, 2018, now Pat. No. 11,094,163.

(60) Provisional application No. 62/634,758, filed on Feb. 23, 2018, provisional application No. 62/614,628, filed on Jan. 8, 2018, provisional application No. (Continued)

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3227* (2013.01); *G07F 17/3223* (2013.01)

(58) Field of Classification Search
CPC ............................. G07F 17/32; G07F 17/3211
USPC ............................ 463/13, 16, 20, 22, 25, 30
See application file for complete search history.

(56) References Cited

U.S. PATENT DOCUMENTS

| | | | | |
|---|---|---|---|---|
| 10,898,814 | B2 * | 1/2021 | Wright | A63F 13/537 |
| 2011/0065490 | A1 * | 3/2011 | Lutnick | G07F 17/3223 463/16 |
| 2017/0236364 | A1 * | 8/2017 | Heathcote | G07F 17/329 463/20 |

* cited by examiner

*Primary Examiner* — Adetokunbo O Torimiro
(74) *Attorney, Agent, or Firm* — Newman Law, LLC

(57) ABSTRACT

Embodiments of the present invention provide entertainment gaming systems and methods comprising, among other things, a real world non-random number outcome generator machine and an entertainment gaming machine wherein the non-random outcome from the real world non-random number generator machine is processed into an entertainment gaming machine outcome. The entertainment gaming system and method of embodiments of the invention may be configured to collect non-random number based outcome from a real-world event and transmitting it to the entertainment gaming machine. The non-random number outcome from the real-world is processed into an entertainment gaming machine outcome event by the entertaining game machine processor or by the central server. The central server communicates with the real word non-random number outcome generator and entertainment gaming machine wherein the central server further transmit the processed outcome to the entertainment gaming machine to generate the game result requested by the triggering event on the entertainment gaming machine.

20 Claims, 6 Drawing Sheets

Related U.S. Application Data

62/594,477, filed on Dec. 4, 2017, provisional application No. 62/565,642, filed on Sep. 29, 2017, provisional application No. 62/563,061, filed on Sep. 25, 2017.

Output of Algorithm – Basic Example

- Basic algorithm to convert 100 8-second data points into Call Pricing (purchased in blocks of 100)

| Valuetimes100AllOutcomes | PriceFor100AllOutcomes | PriceFor100OneOutcome | NumberPayouts | OptionChainBreakpoint |
|---|---|---|---|---|
| 33.5502142999906 | 35.00 | 0.35 | 15 | 0.01 |
| 19.6328279999949 | 20.00 | 0.20 | 10 | 0.02 |
| 9.7705174999993 | 10.00 | 0.10 | 5 | 0.03 |
| 4.80723470000123 | 5.00 | 0.05 | 4 | 0.04 |
| 0.944924199999946 | 1.00 | 0.01 | 1 | 0.05 |

FIG. 6

ENTERTAINMENT GAMING MACHINE BASED ON NON-RANDOM OUTCOMES

CROSS-REFERENCE TO RELATED APPLICATIONS

This application is a continuation of U.S. Non-Provisional application Ser. No. 16/141,959 filed Sep. 25, 2018 and issued as U.S. Pat. No. 11,094,163 on Aug. 17, 2021, which claims the priority benefit of U.S. Provisional Patent Application No. 62/563,061 filed Sep. 25, 2017; U.S. Provisional Patent Application No. 62/565,642 filed on Sep. 29, 2017; U.S. Provisional Patent Application No. 62/594,477 filed on Dec. 4, 2017; U.S. Provisional Patent Application No. 62/614,628 filed on Jan. 8, 2018; and U.S. Provisional Patent Application No. 62/634,758 filed on Feb. 23, 2018, the disclosures of which are incorporated herein by reference.

TECHNICAL FIELD

The present invention relates to gaming systems and methods and, more particularly, to systems and methods for converting a real world financial trading non-random number outcome into entertainment investment machines.

BACKGROUND

The outcome of most gambling gaming machines, such as slot machines is controlled by a random number generated on occurrence of the triggering event, such as but not limited to, pressing a button or pulling a lever on the machine by the user on a physical slot machine (offline scenario) or clicking on a user interface button on a computing machine (online scenario). Thus, a random number generated as a result of above-explained scenario, on the slot machine or computing machine decides whether the player has won or lost. The physical slot machine or computing machine further comprises a controller. The random number outcome of the gambling games is generated by the random number generator or software algorithm executed by the controller. The gambling games include but are not limited to Slot Reels, Video Slots, Video Poker, Blackjack, Craps, Baccarat, Poker, Video Games, Games that mix skill and random numbers, etc.

Traditionally, random number generator or software algorithm to be executed by the controller is designed or programmed to achieve a certain payback percentage. The payback percentage is the percentage of the total money put in by all of the players that are eventually paid out to the winning player(s). A disadvantage of using random number generator to determine the outcome of gambling games is that the casino would take about 10 percent of all money put into the slot machine and give away the other 90 percent which means the players are always playing against the house advantage. Another disadvantage with the traditional random number based games is that providing these games online and deciding the winner using random numbers is illegal in many countries.

Therefore, there is a need of an entertainment experience where the users do not have to play against the house advantage and have the maximum probability of winning the game, and in fact are participating in the legal activity of (in one embodiment) financial investing.

SUMMARY

Some embodiments of the invention are directed to a gaming system comprising: a central server in communication with the real world non-random number outcome generator machine for receiving a non-random number based outcomes in connection with a real world event; a controller configured to associate received non-random number based outcomes with game outcomes in a gaming machine, wherein the controller in combination with an algorithm determines a game outcome played on the gaming machine; a communication device configured to transmit the game outcome of the gaming machine; and a processor for generating the transmitted game outcome to the gaming machine.

In an embodiment of the present invention, a gaming system and method comprises a central server in communication with the real world non-random number outcome generator machine such as but not limited to stock or securities trading computing machine, high-frequency trading computing machine, high volatility ETF etc. and an entertainment gaming machine which further comprises a controller. The entertainment gaming system and method of the present invention is configured to collect non-random number based outcome from a real-world event such as but not limited to stock or securities trading, high-frequency trading, high volatility ETF etc. and transmitting it to the central server. The central server further comprises a transceiver to receive non-random number outcome from the real-world event, an algorithm to process received non-random number outcome into an entertainment gaming outcome, which may include a database to store received real world non-random number based outcome and processed entertainment gaming outcome generated from the received non-random number based outcome. The central server further transmits the processed outcome in the form of an entertainment gaming outcome to the entertainment gaming machine to generate and render the game result. This game result may be rendered into any form of game that otherwise requires a random number generator to determine the outcome.

In another embodiment of the present invention, a gaming machine and method comprises an entertainment gaming machine in direct communication with the real world non-random number outcome generator machine such as but not limited to stock or securities trading computing machine, high-frequency trading computing machine, high volatility ETF etc. The entertainment gaming system and method of the present invention is configured to collect non-random number based outcome from a real-world event such as but not limited to stock or securities trading, high-frequency trading, high volatility ETF etc. The entertainment gaming machine comprises a transceiver to receive non-random number outcome from the real-world event, an algorithm to process received non-random number outcome into an entertainment gaming outcome, which may include a database to store received real world non-random number based outcome and processed entertainment gaming outcome generated from the received non-random number based outcome. The entertainment gaming machine then generates and renders the game result. This game result may be rendered into any form of game that otherwise requires a random number generator to determine the outcome.

In another embodiment of the present invention, a gaming system and method of the present invention further comprises a financial trading computing machine such as but not limited to stock or securities trading computing machine, high-frequency trading computing machine, high volatility ETF etc. in communication with the central server communicating non-random number based financial trading outcome on a regular basis. The central server further communicates this outcome to the entertainment gaming machine to generate the game result.

Advantage of the incorporation of non-random number outcome from financial trading into entertainment gaming outcome of the entertainment games is that the users do not have to play against the house advantage and have the maximum probability of winning the game, as they are participating as investors. Also, as the outcome from the financial trading is non-random, online gaming outcome based upon any kind of financial trading or any other non-random number based outcome event would be legal as required by the various country laws. The rendering of the games may include but is not limited to information giving the players, hints about the current metrics of the market including volatility or trends, or other information in the public domain relating in any way to the non-random outcomes.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 6 illustrates shows a simple example of how the frequency of outcomes of market movements can be translated into results in the gaming experience.

DETAILED DESCRIPTION

Figure 1:
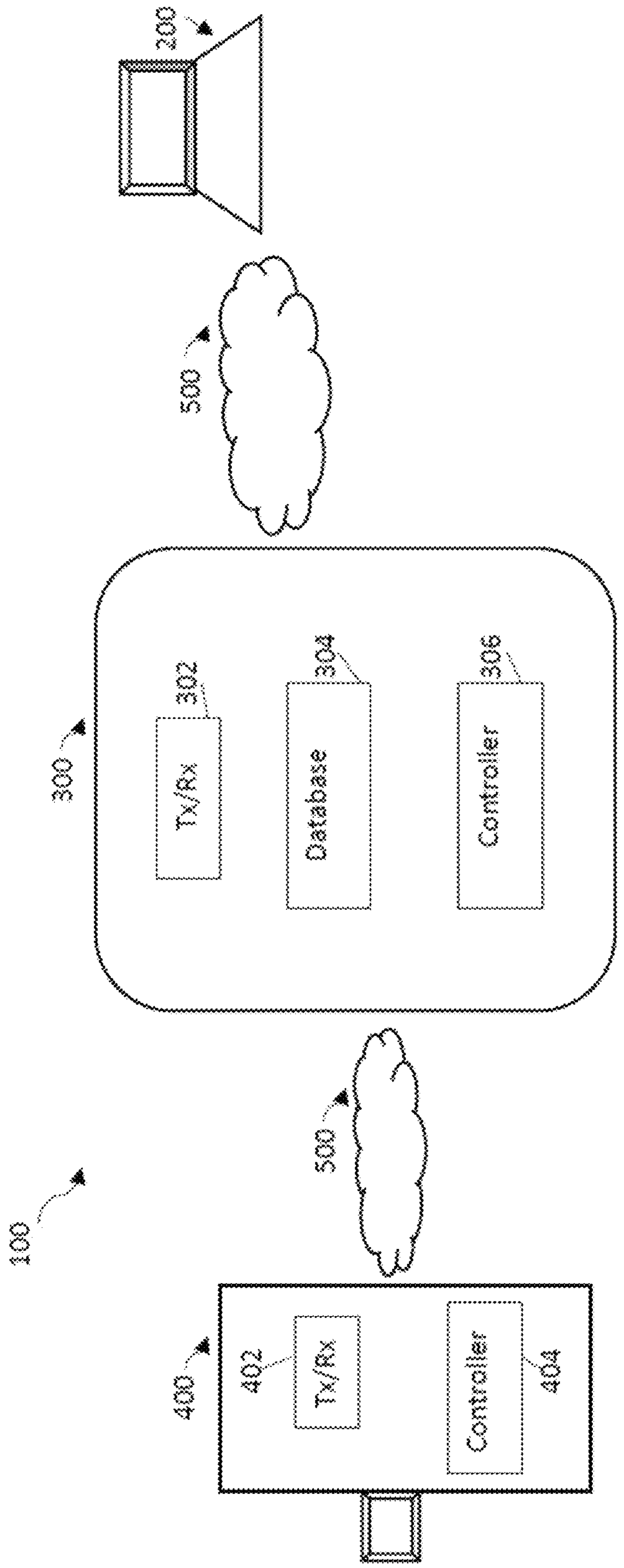
FIG. 1 illustrates an entertainment gaming system based on non-random outcome in accordance with an embodiment of the present invention.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to “one embodiment,” “at least one embodiment,” “an embodiment,” “one example,” “an example,” “for example,” and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase “in an embodiment” does not necessarily refer to the same embodiment.

One embodiment of the invention provides for an online entertainment machine configured to provide players with remote access to a game presented thereon. In some embodiments, the game includes a user interface generally resembling an online slot machine rendering results of investments in financial trading. The player of the game experiences an interaction through the user interface that is mathematically similar to a gambling experience on a regular slot machine. While a regular slot machine uses a random number generator to determine the outcome of the gambling activity, the embodiment discussed herein provides a game outcome based on the results of activity on derivative, option, stock, or other securities trading occurring independently via computing machine, high-frequency trading computing machine, high volatility ETF etc. One advantage of this method is that all parties can win in the gaming experience provided by embodiments of the invention in a similar way to that all investors can gain responsive to market activity, such as if the market increases.

The type of trading on the securities can involve complex positions taken using derivatives such as call or put options to build models, including but not limited to a straddle, that alter the risk profile of the operator of the gaming experience. These positions can also be used to alter the results of the gaming experience. For example, market fluctuations or unusual movements in the call or put options may be used to simulate the experience of winning a jackpot. In one embodiment, the algorithm for these complex positions will take into account historical volatility profiles of a large number of equities and calculate high frequency pricing of extremely short term call or put options (for example, 8 seconds)—while simultaneously taking positions to protect the entertainment gaming seed funding from extreme market moves. This algorithm combines advanced probability theory and statistics with advanced financial trading theory.

The gaming experience could include playing on any platform through which random events can be simulated, such as traditional slot machines, electronic table games and online gaming machines, such as online slot machines or online video poker, played through terminals, personal computers or mobile devices. In this embodiment market data, such as movements or changes, which may be general changes or changes relative to specific positions, are translated into different forms of random events ranging from jackpots to lottery outcomes to cards in video poker games to results of a play on an online gaming machine which can then be displayed to players. In other embodiments, such market data may form the basis for determining outcomes relative to input received through an interface of the invention which can then be simulated as traditional gaming events and outcomes through any of the aforementioned platforms of the invention.

In another embodiment the gaming experience could include using cabinets that resemble traditional slot machines, electronic table games, or online gaming machines such as online slot machines or online video poker. In this embodiment the software inside these devices may not use translation into random events but may instead use an algorithm, such as the algorithm described above, thus eliminating all randomness from the embodiment.

FIG. 1 illustrates an embodiment of the present invention comprising an entertainment gaming system 100 which further comprises a real world non-random number outcome generator machine 200, a central server 300, a communication network 500 and an entertainment gaming machine 400. The real world non-random number outcome generator machine 200 such as but not limited to stock or securities trading computing machine, high-frequency trading computing machine, high volatility ETF etc. communicates with the central server 300 through the communication network 500. The entertainment gaming machine 400 further comprises a transceiver 402 and a controller 404 wherein the entertainment gaming machine 400 also communicates with the central server 300 through the communication network 500.

Figure 2:
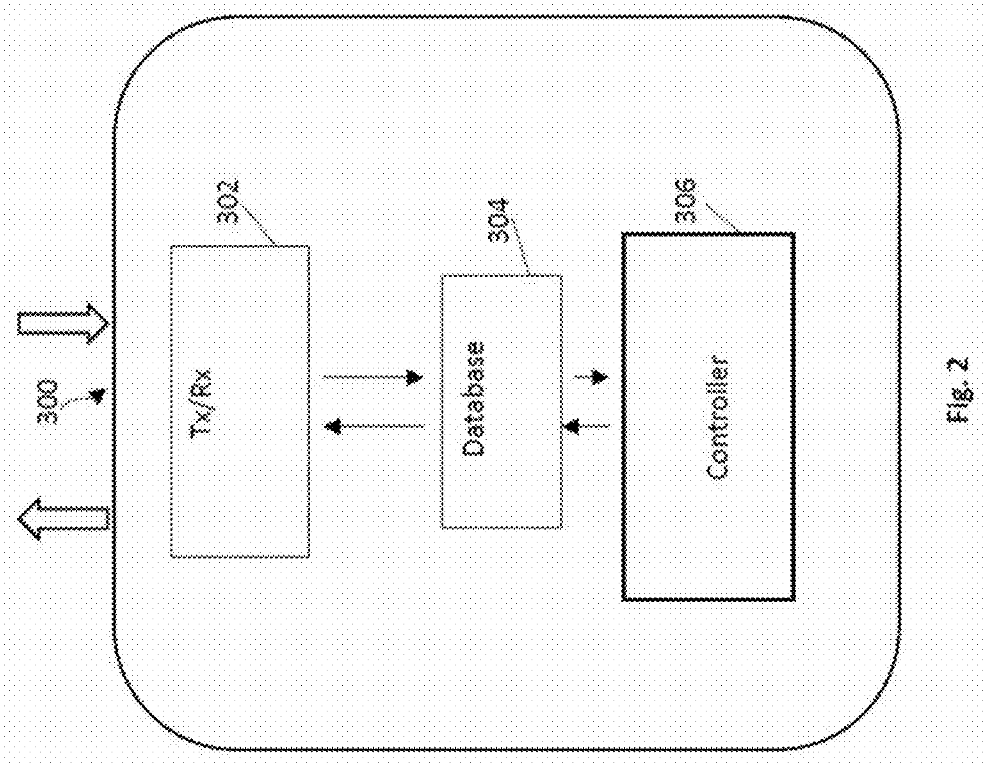
FIG. 2 illustrates a central server in accordance with an embodiment of the present invention.

FIG. 2 illustrates the central server 300 in accordance with another embodiment of the present invention. The central server 300 comprises a transceiver 302, a database 304 and a controller 306. It is known in the art that a separate transmitter and receiver can also be used instead of a transceiver 302. The database 304 stores an algorithm which processes the non-random number based outcome collected from the real-world event into an entertainment gaming based outcome to be transmitted to entertainment gaming machine 400.

The central server 300 is further connected to the gaming machine 400 through the communication network 500. The central server 300 is configured to collect non-random number based outcome generated by the non-random number outcome generator machine 200 from a real-world event such as but not limited to stock or securities trading, high-frequency trading, high volatility ETF etc. The non-random number based outcome received by the central server is stored in the database 304 of the central server 300 and processed by the controller 306 using a pre-stored algorithm to convert said stored non-random number based outcome into entertainment gaming outcome which is further transmitted to the entertainment gaming machine 400 to generate entertainment gaming outcome requested by the triggering event on the entertainment gaming machine 400. This transmission of the processed output by the central server 300 to the entertainment gaming machine 400 can either take place at regular intervals or only on the detection of the triggering event at the entertainment gaming machine 400. The entertainment gaming machine 400 can be any kind of slot machine or a entertainment game computing device. For an offline scenario, triggering event can be created on the entertainment gaming machine 400 by pressing a button or pulling a lever on a physical slot machine and for an online scenario, triggering event can be created by clicking a button of a mouse or a user interface button on a computing machine.

Further referring back to FIG. 1, the network 500 can be any wireless or wired network such as but not limited to wireless LAN, Local Area Networks, Wide Area Networks etc.

Figure 3:
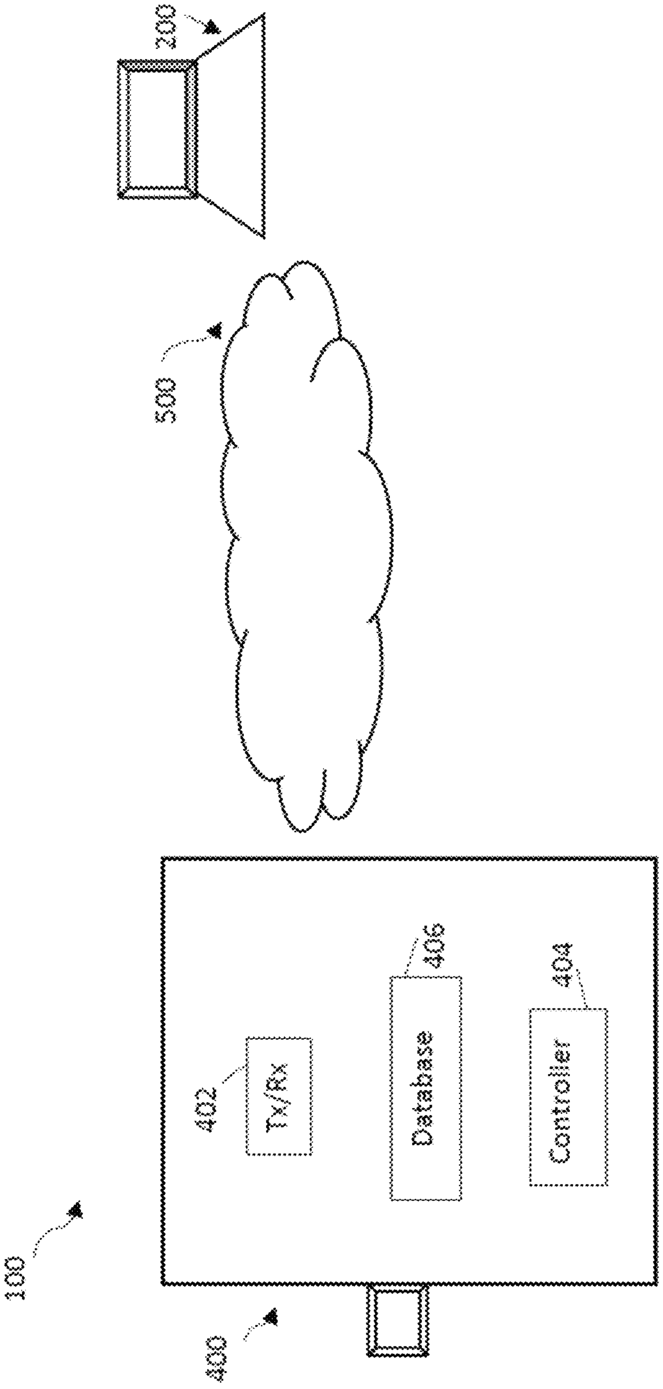
FIG. 3 illustrates an entertainment gaming system based on non-random outcome in accordance with another embodiment of the present invention.

FIG. 3 illustrates another embodiment of the present invention comprising an entertainment gaming system 100 comprising a real world non-random number outcome generator machine 200, in direct communication with an entertainment gaming machine 400 via a communication network 500. The entertainment gaming machine 400 further comprises a transceiver 402 to receive non-random number outcome from the real-world event. The non-random number based outcome received by the gaming system is stored in the database 406 and processed by the controller 404 using a pre-stored algorithm to convert said stored non-random number based outcome into entertainment gaming outcome requested by the triggering event on the entertainment gaming machine 400.

Figure 4:
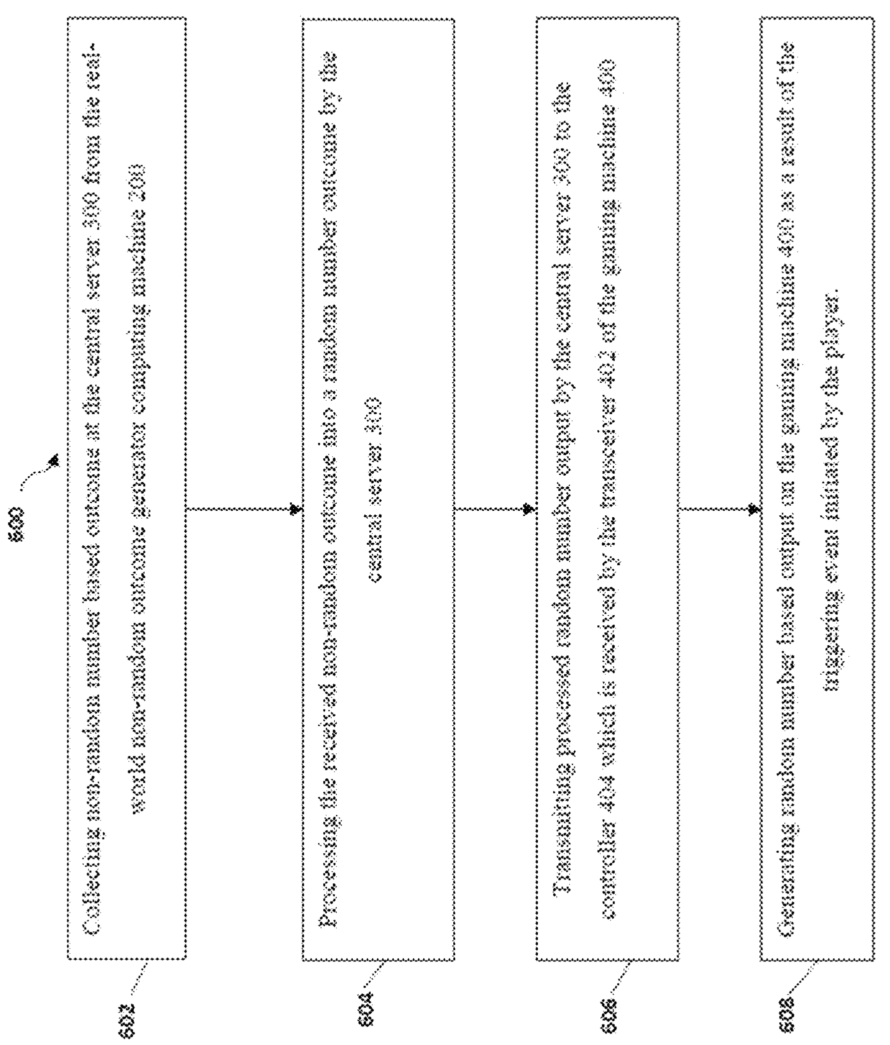
FIG. 4 illustrates a method in accordance with one or more embodiments of the present invention.
Figure 5:
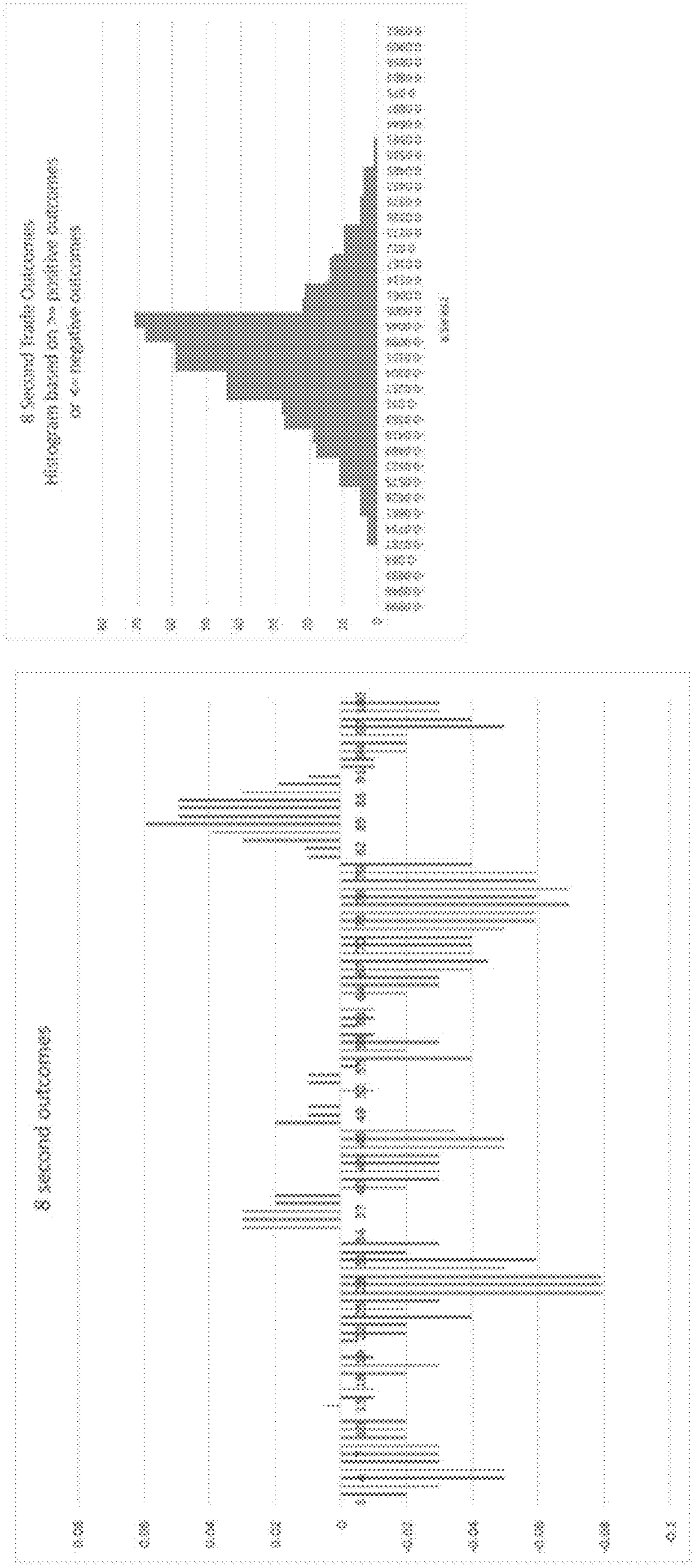
FIG. 5 shows two graphs illustrating how the short term price, shown on the left hand graph, can be translated into a probability distribution shown in the right hand graph. This illustrates how the market movements can be translated into a game like experience.

FIG. 4 illustrates a method 600 in accordance with one or more embodiments of the present invention for converting a real world financial trading non-random number outcome into an entertainment gaming outcome of the entertainment games. At step 602, the system 100 collects non-random number based outcome at the central server 300 or at the entertainment gaming machine 400 from the real-world non-random outcome generator machine 200. At step 604, the central server 300 or entertainment gaming machine 400 processes the received non-random outcome into an entertainment gaming outcome. At step 606, as a result of the triggering event initiated by the player, generating entertainment gaming outcome on the entertainment gaming machine 400 using processed outcome generated by the entertainment gaming machine 400 or transmitted by the central server 300 to the controller 404 of the entertainment gaming machine 400 which is received by the transceiver 402 of the entertainment gaming machine 400.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device and implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

In some embodiments, the methods, systems, and media disclosed herein include at least one computer program, or use of the same. A computer program includes a sequence of instructions, executable in the digital processing device's CPU, written to perform a specified task. In some embodiments, a computer program includes a web application. In light of the disclosure provided herein, those of skill in the art will recognize that a web application, in various embodiments, utilizes one or more software frameworks and one or more database systems. In some embodiments, a computer program includes a mobile application provided to a mobile digital processing device. In some embodiments, a computer program includes a standalone application, which is a program that is run as an independent computer process, not an add-on to an existing process, e.g., not a plug-in. In some embodiments, the computer program includes a web browser plug-in.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified herein, or in the flowchart and/or block diagram block or blocks.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This gaming experience can be extended to competitive play, for example different players could complete for a shared bonus payment. Two methods to implement the competitive play include some player skill component based on representation of the market movements or completely random events based on market movements.

The gaming experience can be extended to social media with rendering of events such as gaming outcomes to social media platforms.

This gaming experience can be extended to individual skill based game targets. In one embodiment the player enters a challenge (for example a video game obstacle course) with milestones and the reward for each milestone is participation in one or more outcomes from the real world non-random number outcome generator machine such as but not limited to stock or securities trading computing machine, high-frequency trading computing machine, high volatility ETF etc.

It will be apparent to persons skilled in the art that numerous variations and/or modifications may be made to the present invention as shown in the specific embodiments without departing from the spirit or scope of the invention as broadly described. The above described embodiments are intended to illustrate the principles of the invention, but not to limit the scope of the invention.

The invention claimed is:

1. A gaming system comprising at least one of a processing device, a database, a display device and a data communication device, configured to:

receive one or more non-random number based outcomes in connection with a real world event, wherein the database stores the received non-random number based outcomes in connection with the real world event;

select one or more non-random number based outcomes to be associated with one or more game outcomes in a game displayed on the display device, the game appearing as a game of chance, wherein the one or more non-random number based outcomes comprise one or more securities subject to market fluctuations occurring independently of the display of the game;

responsive to detecting a triggering event in a session of the game displayed on the display device, processing the non-random number based outcomes in combination with an algorithm, the algorithm being configured to apply a historical volatility of the one or more securities to determine probable future pricing for the one or more securities in comparison with the one or more non-random number based outcomes for the one or more securities to determine the session outcome of the session of the game displayed on display device without consideration of a preset payback percentage; and display on the display device the session outcome.

2. A gaming system according to claim 1, wherein the triggering event comprises receiving credit for enabling the game session.

3. The gaming system of claim 1, wherein the triggering event comprises receiving a selection to play the game session.

4. The gaming system of claim 1, wherein the triggering event comprises receiving a selection during play of the game session.

5. The gaming system of claim 1, wherein the game is displayed on the display device as a slot game.

6. The gaming system of claim 1, wherein the game is displayed on the display device as a game involving playing cards.

7. A gaming system configured to provide interactive play of a game on a mobile device comprising:

a central server configured to receive one or more non-random number based outcomes in connection with a real world event, wherein the central server is in communication with a database, the database storing the received one or more non-random number based outcomes in connection with the real world event;

a controller configured to associate the received one or more non-random number based outcomes with outcomes in a game displayed on a display device associated with the mobile device, wherein the received one or more non-random number based outcomes comprise one or more securities positions subject to market fluctuations, wherein responsive to the controller detecting a triggering event in a session of the game displayed on the display device, the controller processing the received one or more non-random number based outcomes in combination with an algorithm, the algorithm being configured to use historical volatility of the one or more securities positions to determine probable future pricing for the one or more securities and in comparison with the received one or more non-random number based outcomes for the one or more securities, the algorithm being further configured to facilitate the determination of a game session outcome for the session of the game displayed on the display device without a preset payback percentage; and a communication device configured to display on the display device as the game session outcome of the game.

8. The gaming system of claim 7, wherein the triggering event comprises receiving credit for enabling play of the session.

9. The gaming system of claim 7, wherein the triggering event comprises receiving a selection to play the session.

10. The gaming system of claim 7, wherein the triggering event comprises receiving a selection during the session.

11. The gaming system of claim 7, wherein the game is displayed as a slot game.

12. The gaming system of claim 7, wherein the game is displayed as a card game.

13. The gaming system of claim 7, wherein the game is displayed as a video poker game.

14. A method for providing a game over a communication network without a preset payback percentage, comprising the steps of:

a central server operatively associated with a memory, a processor and a data communication device in communication with a mobile device through the communication network, the data communication device receiving one or more non-random number based outcomes in connection with a real world event;

storing the received one or more non-random number based outcomes in connection with the real world event in a database;

the processor associating the received one or more non-random number based outcomes with outcomes in a game displayed on a display device associated with the mobile device, wherein the non-random number based outcomes comprise one or more securities positions subject to market fluctuations;

responsive to the processor detecting a triggering event in a session of the game displayed on the display device associated with the mobile device, the controller processing the non-random number based outcomes in combination with an algorithm, wherein the algorithm is configured to use historical volatility of the one or more securities positions to determine probable future pricing for the one or more securities and in comparison with the received non-random number based outcomes for the one or more securities, and wherein the algorithm is further configured to facilitate the determination of a game session outcome for the session of the game displayed on the display device without a preset payback percentage; and displaying on the display device the game session outcome of the game.

15. The method of claim 14, wherein the triggering event comprises receiving credit for enabling play of the session.

16. The method of claim 14, wherein the triggering event comprises receiving a selection to play the session.

17. The method of claim 14, wherein the triggering event comprises receiving a selection during the session.

18. The method of claim 14, wherein the game is displayed as a slot game.

19. The method of claim 14, wherein the game is displayed as a card game.

20. The method of claim 14, wherein the game is displayed as a video poker game.

* * * * *